(12) United States Patent
Gomi et al.

(10) Patent No.: US 12,504,743 B2
(45) Date of Patent: Dec. 23, 2025

(54) DEVICE FOR ANALYZING RESPONSIVENESS OF AN API

(71) Applicant: FANUC CORPORATION, Yamanashi (JP)

(72) Inventors: Shunichi Gomi, Yamanashi (JP); Kazuo Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 503 days.

(21) Appl. No.: 18/042,695

(22) PCT Filed: Sep. 2, 2021

(86) PCT No.: PCT/JP2021/032348
§ 371 (c)(1),
(2) Date: Feb. 23, 2023

(87) PCT Pub. No.: WO2022/054695
PCT Pub. Date: Mar. 17, 2022

(65) Prior Publication Data
US 2023/0333539 A1 Oct. 19, 2023

(30) Foreign Application Priority Data
Sep. 9, 2020 (JP) .................................. 2020-151431

(51) Int. Cl.
*G05B 19/4155* (2006.01)
*G05B 19/406* (2006.01)
(52) U.S. Cl.
CPC ....... *G05B 19/4155* (2013.01); *G05B 19/406* (2013.01)
(58) Field of Classification Search
CPC .............. G05B 19/4155; G05B 19/406; G06F 2201/865; G06F 11/3419; G06F 11/34; G06F 11/30; G06F 11/3466
See application file for complete search history.

(56) References Cited

U.S. PATENT DOCUMENTS 6,078,747 A 6/2000 Jewitt
2015/0220376 A1* 8/2015 Srivastava ............ G06F 11/327
714/37
(Continued)

FOREIGN PATENT DOCUMENTS

CN 110457196 A 11/2019
CN 110651260 A 1/2020
(Continued)

OTHER PUBLICATIONS

International Search Report issued in PCT/JP2021/032348; mailed Nov. 22, 2021.

*Primary Examiner* — Eric J Yoon
(74) *Attorney, Agent, or Firm* — Studebaker Brackett PLLC

(57) ABSTRACT

Provided is a response analysis device which can efficiently confirm a response of an API. This response analysis device comprises: an execution history acquisition unit which acquires history information about an API; a first determination unit which determines an execution period and a processing time of the API corresponding to a newly added application; a second determination unit which determines an execution start time and a processing time of the API corresponding to an existing application on the basis of the history information obtained by the execution history acquisition unit; and a response analysis unit which analyzes a response of the API on the basis of the execution period and the processing time of the API corresponding to the newly added application, and the execution start time and the processing time of the API corresponding to the existing application.

5 Claims, 6 Drawing Sheets

(56) References Cited

U.S. PATENT DOCUMENTS

| | | | |
|---|---|---|---|
| 2019/0057016 A1 | 2/2019 | Pasquini et al. | |
| 2020/0081814 A1* | 3/2020 | Srinivasan | G06F 8/71 |
| 2021/0319151 A1* | 10/2021 | Chen | G06F 30/20 |

FOREIGN PATENT DOCUMENTS

| | | |
|---|---|---|
| JP | 2000-276361 A | 10/2000 |
| JP | 2009-301079 A | 12/2009 |
| JP | 2017-027178 A | 2/2017 |
| WO | 2021/157515 A1 | 8/2021 |

* cited by examiner

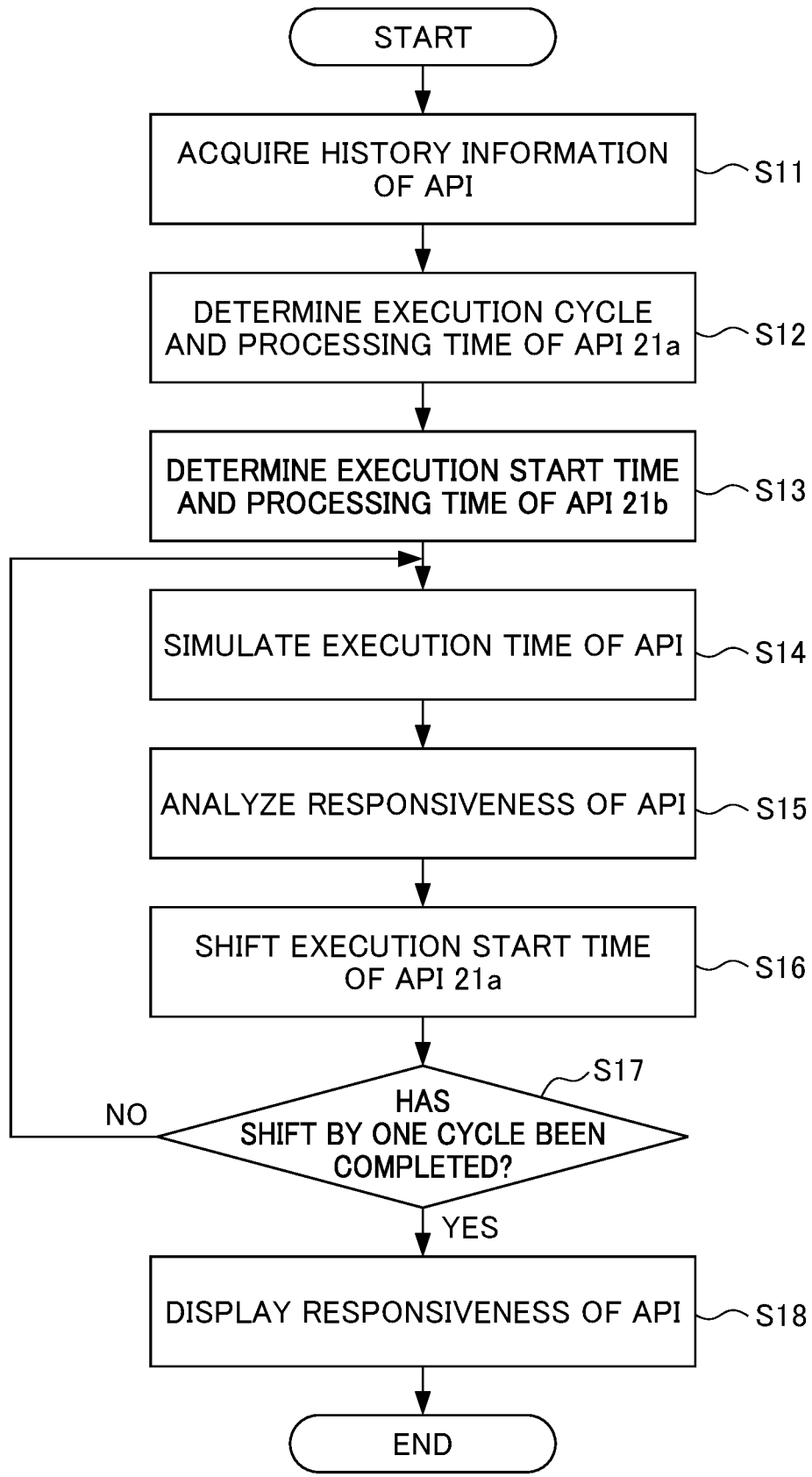

DEVICE FOR ANALYZING RESPONSIVENESS OF AN API

TECHNICAL FIELD

The present invention relates to a responsiveness analysis device.

BACKGROUND ART

Conventionally, a numerical control device has been known that can use an API (Application Programming Interface) (for example, see Patent Document 1). If a plurality of APIs are executed at the same time when the numerical control device responds to requests from the APIs in order, process waiting of the APIs is caused, and thus the numerical control device delays the response to the APIs. In this case, there is a possibility that an API call cycle required for the application cannot be satisfied. Therefore, it is necessary to investigate an influence of an increase in access due to the APIs on existing systems and applications at the time of changing an application configuration of existing facilities.

Patent Document 1: Japanese Unexamined Patent Application, Publication No. 2017-27178

DISCLOSURE OF THE INVENTION

Problems to be Solved by the Invention

At present, in the case of changing an application configuration of existing facilities, the application configuration is actually changed to check whether there is any problem in responsiveness of the API of each application. However, with such a check method, the responsiveness of the API cannot be checked until the configuration of the application is actually changed. Therefore, at present, the check of the responsiveness of the API is inefficient, and Thus it is demanded to efficiently check the responsiveness of the API.

Means for Solving the Problems

The present disclosure provides a responsiveness analysis device including: an execution history acquisition unit that acquires history information on an application programming interface (API); a first determination unit that determines an execution cycle and a processing time of the API corresponding to a newly added application; a second determination unit that determines an execution start time and a processing time of the API corresponding to an existing application, based on the history information acquired by the execution history acquisition unit; and a responsiveness analysis unit that analyzes responsiveness of the API, based on the execution cycle and the processing time of the API corresponding to the newly added application and the execution start time and the processing time of the API corresponding to the existing application.

Effects of the Invention

According to the present invention, it is possible to efficiently check the responsiveness of the API.

BRIEF DESCRIPTION OF THE DRAWINGS

FIG. 6 is a flowchart showing processing of the responsiveness analysis device.

PREFERRED MODE FOR CARRYING OUT THE INVENTION

Figure 1:
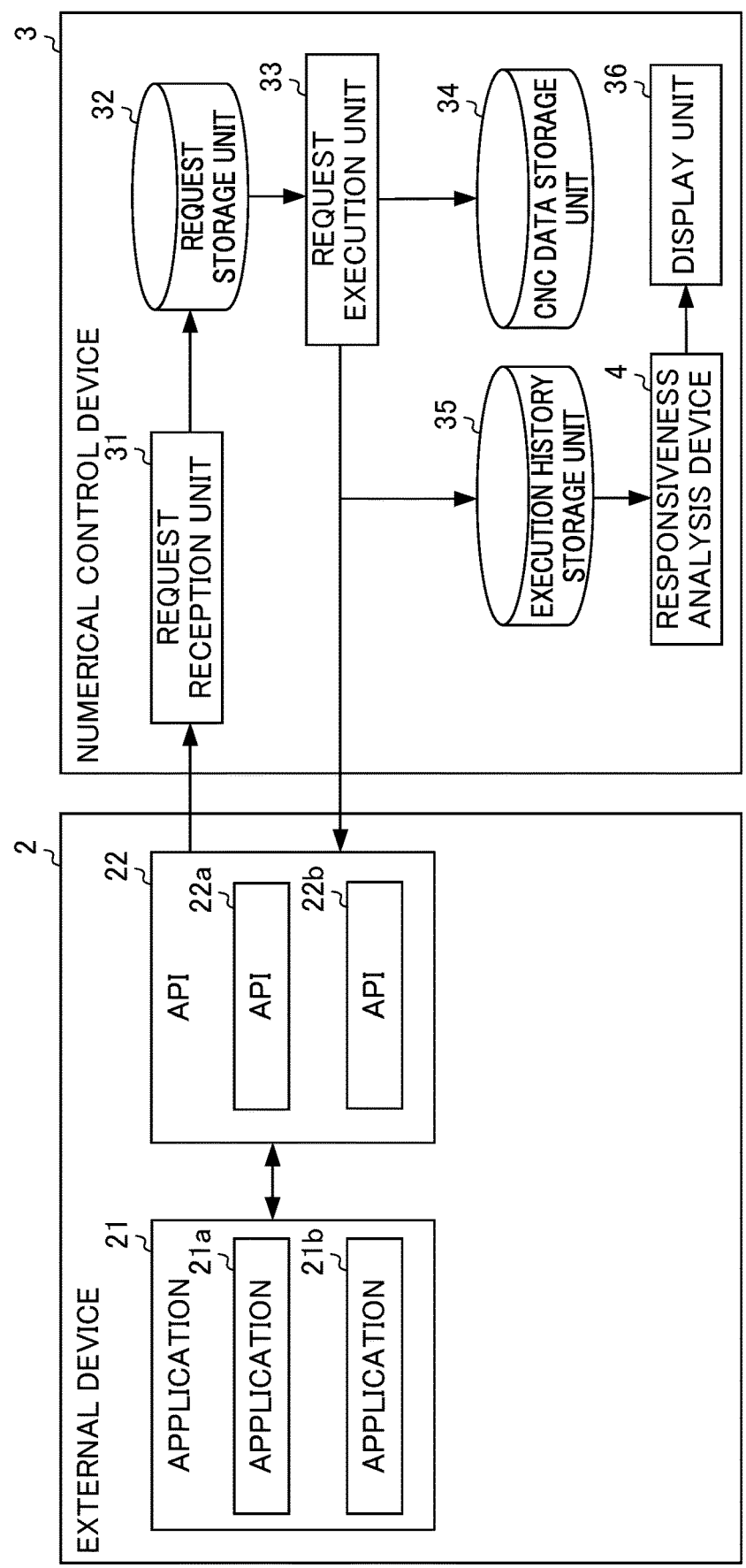
FIG. 1 is a diagram showing a configuration example of a numerical control system.

An example of an embodiment of the present invention will be described below. FIG. 1 is a diagram showing a configuration example of a numerical control system 1. As shown in FIG. 1, the numerical control system 1 includes an external device 2 and a numerical control device 3. The external device 2 is, for example, a computer device including a controller and a memory. The external device 2 is communicably connected to the numerical control device 3 via a communication interface or the like.

Further, the external device 2 includes an application 21 and an application programming interface (API) 22. The application 21 includes a plurality of application that execute predetermined processing on The numerical control device 3.

The application 21 includes a newly added application 21a and an existing application 21b. Further, the API 22 includes an API 22a corresponding to the newly added application 21a and an API 22b corresponding to the existing application 21b.

The external device 2 accesses data of the numerical control device 3 by executing the API 22 from the application 21. For example, the external device 2 monitors an operation status of a machine tool connected to the numerical control device 3 with the application 21 using the API 22.

The numerical control device 3 is connected to the machine tool and controls the operation of the machine tool. The numerical control device 3 is communicably connected to the external device 2 via a communication interface or the like. In addition, the numerical control device 3 includes a request reception unit 31, a request storage unit 32, a request execution unit 33, a CNC data storage unit 34, an execution history storage unit 35, a display unit 36, and a responsiveness analysis device 4.

The request reception unit 31 receives request data from the API 22, and stores the received request data in the request storage unit 32. The request execution unit 33 reads the request data stored in the request storage unit 32.

The request execution unit 33 accesses CNC data stored in the CNC data storage unit 34 based on the read request data, and executes the request received from the API 22. The execution history storage unit 35 stores history information on the API 22. The history information on the API 22 is acquired from the API 22 by, for example, a control unit of the numerical control device 3, and is stored in the execution history storage unit 35. The history information on the API 22 includes, for example, an execution start time, an execution cycle, and a processing time of the API 22 corresponding to each of the applications 21.

The display unit 36 is configured by, for example, a liquid crystal display, and displays various data provided from the responsiveness analysis device 4.

The responsiveness analysis device 4 acquires an execution history of the API 22 from the execution history storage unit 35, and analyzes responsiveness of the API 22.

Figure 2:
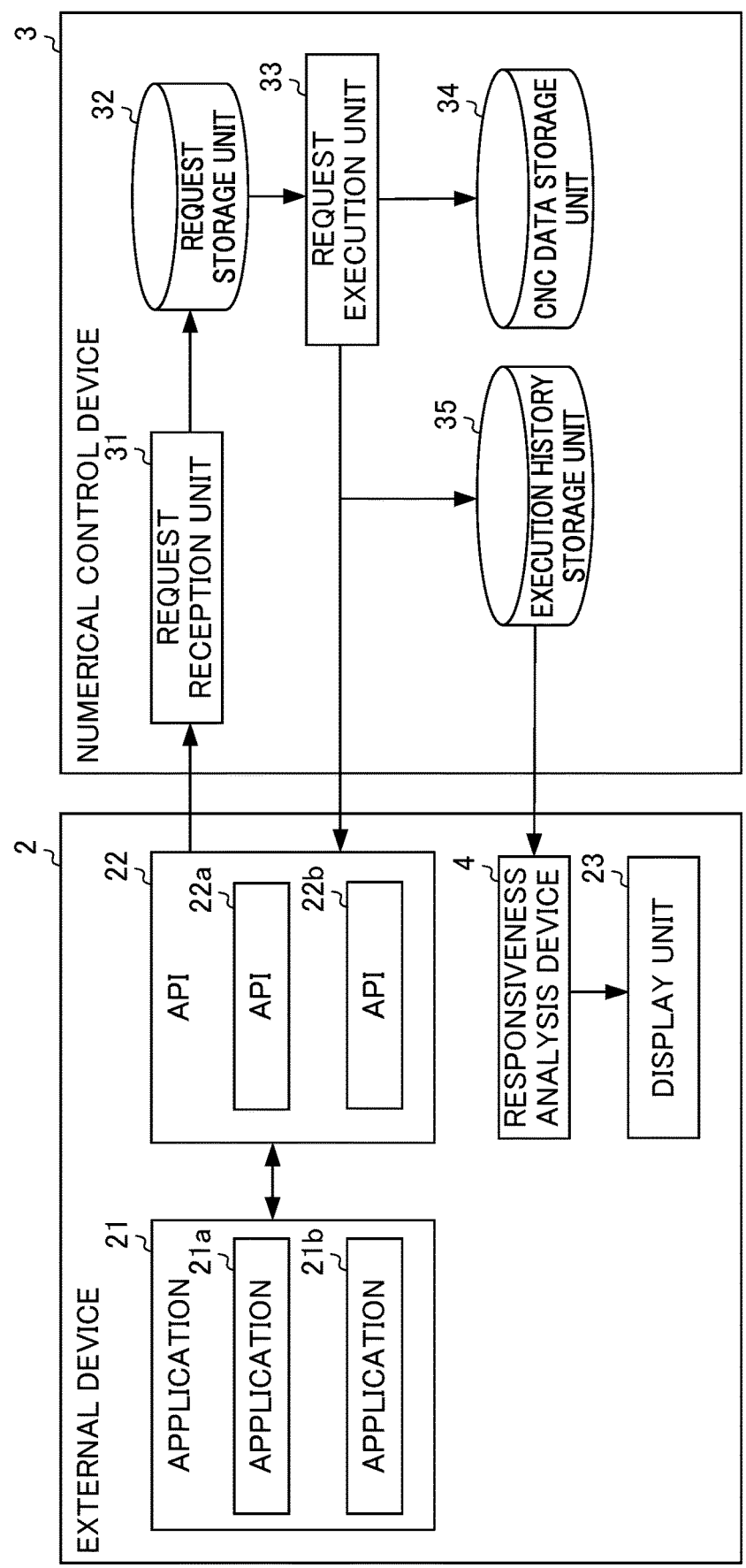
FIG. 2 is a diagram showing another configuration example of the numerical control system.

FIG. 2 is a diagram showing another configuration example of the numerical control system 1. In the numerical control system 1 shown in FIG. 2, an external device 2 includes a responsiveness analysis device 4 instead of the responsiveness analysis device 4 of the numerical control device 3 shown in FIG. 1. Further, the external device 2 includes a display unit 23 instead of the display unit 36 of the numerical control device 3 shown in FIG. 1. The display unit 23 has a configuration similar to that of the display unit 36. Further, other components of the numerical control system 1 shown in FIG. 2 are similar to those of the numerical control system 1 shown in FIG. 1.

Figure 3:
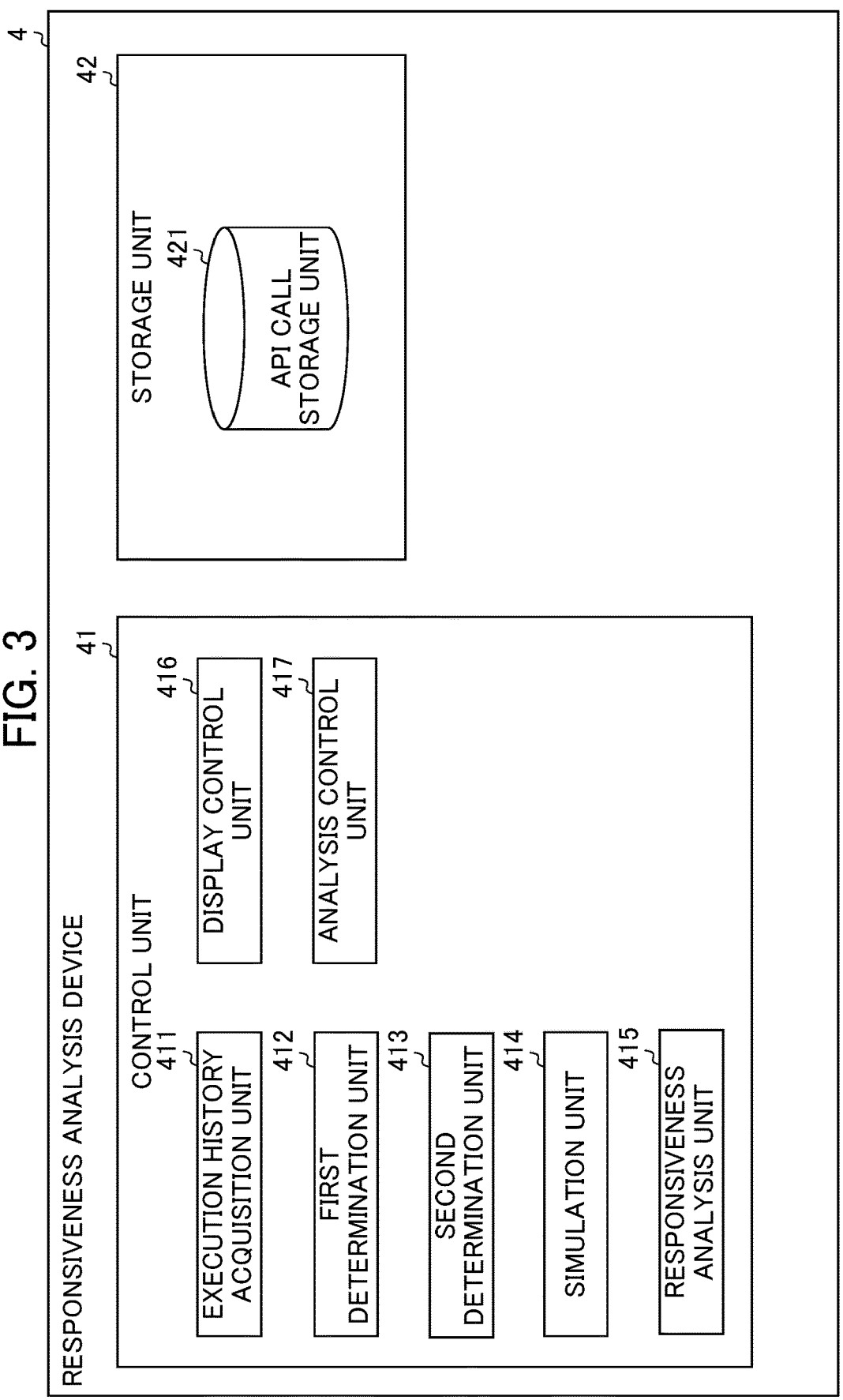
FIG. 3 is a diagram showing a configuration of a responsiveness analysis device.

FIG. 3 is a diagram showing a configuration of the responsiveness analysis device 4. As shown in FIG. 3, the responsiveness analysis device 4 includes a control unit 41 and a storage unit 42. The control unit 41 is a processor such as a CPU (Central Processing Unit), and implements various functions by executing programs stored in the storage unit 42.

Further, the control unit 41 includes an execution history acquisition unit 411, a first determination unit 412, a second determination unit 413, a simulation unit 414, a responsiveness analysis unit 415, a display control unit 416, and an analysis control unit 417.

The storage unit 42 is configured by a ROM (read only memory), a RAM (random access memory), a non-volatile memory, a hard disk drive and the like, and stores various data. Further, the storage unit 42 includes an API call storage unit 421. The API call storage unit 421 stores the execution cycle and the processing time of the API 22 required by the application 21.

The control unit 41 and the storage unit 42 may be provided in common with the external device 2 or the numerical control device 3, or may be provided separately from the external device 2 or the numerical control device 3.

The execution history acquisition unit 411 acquires history information on an execution time of the API 22. Specifically, the execution history acquisition unit 411 accesses the execution history storage unit 35 shown in FIGS. 1 and 2, and acquires history information on the API 22.

The first determination unit 412 determines an execution cycle and a processing time of the API 22a corresponding to the newly added application 21a. Specifically, the first determination unit 412 determines an execution cycle and a processing time of the newly added application 21a to the external device 2, based on the execution cycle and the processing time of the API 22a corresponding to the application 21a stored in the API call storage unit 421.

The second determination unit 413 determines an execution start time and a processing time of the API 22b corresponding to the existing application 21b, based on the history information acquired by the execution history acquisition unit 411. Specifically, the second determination unit 413 acquires the execution start time and the processing time of the API 22b corresponding to the existing application 21b from the history information acquired by the execution history acquisition unit 411, and determines the execution start time and the processing time of the API 22b corresponding to the existing application 21b.

Further, the second determination unit 413 acquires the oldest execution start time of the API 22 corresponding to the existing application 21b from the history information acquired by the execution history acquisition unit 411, and sets such an execution start time as a reference time.

The simulation unit 414 simulates the execution time of the API 22, based on the execution cycle and the processing time of the API 22a corresponding to the newly added application 21a and the execution start time and the processing time of the API 22b corresponding to the existing application 21b.

Figure 4:
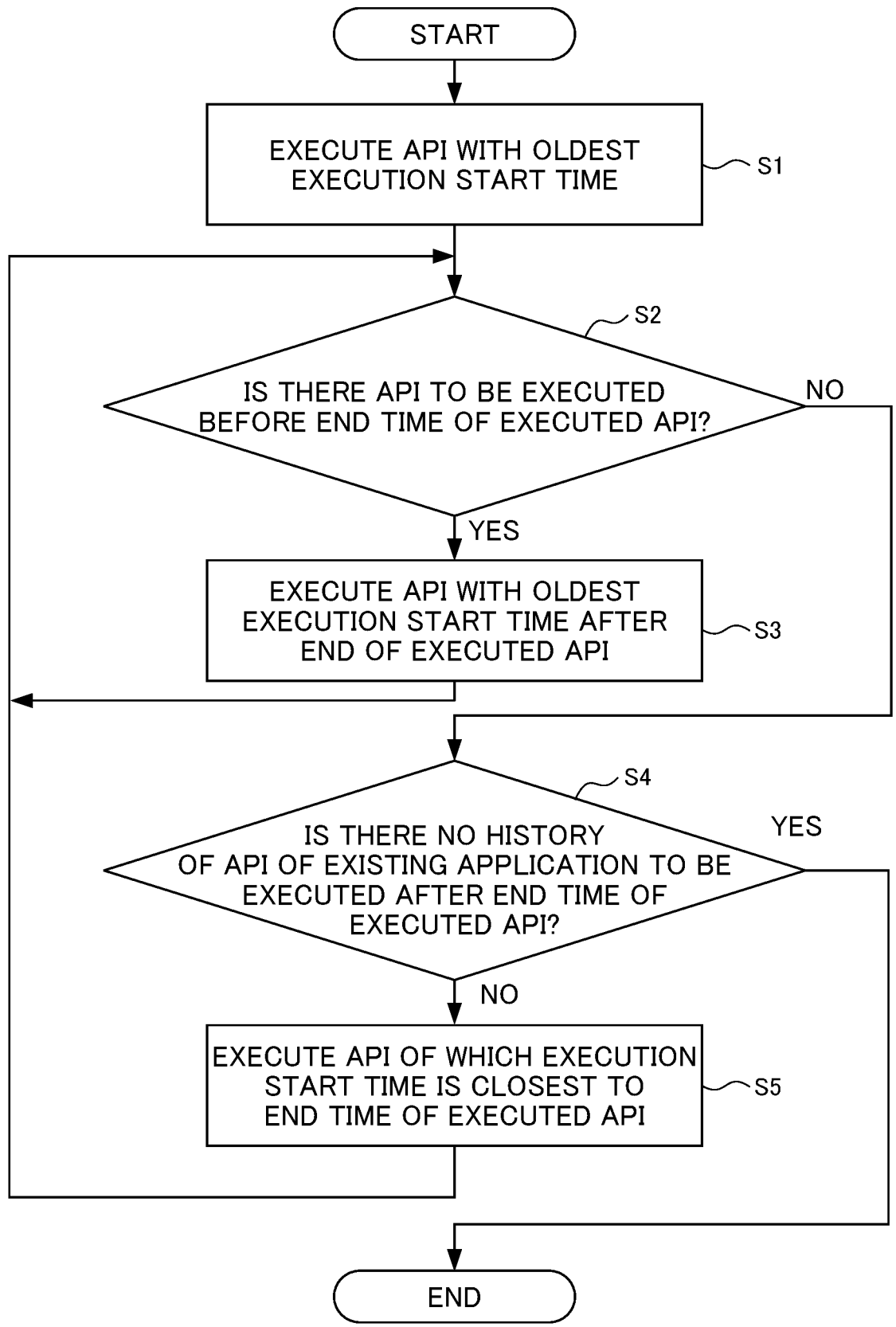
FIG. 4 is a flowchart showing processing of simulating an execution time of an API.

FIG. 4 is a flowchart showing processing of simulating the execution time of the API 22. In Step S1, the simulation unit 414 executes the API 22 with the oldest execution start time among the plurality of APIs 22 in simulation of the execution time of the API 22.

In Step S2, the simulation unit 414 determines whether there is an API 22, which starts before the end time of the executed API 22, among unexecuted APIs 22. When there is the API 22 that starts before the end time of the executed API 22 (YES), the process proceeds to Step S3. On the other hand, when there is no API 22 that starts before the end time of the executed API 22 (NO), the process proceeds to Step S4.

In Step S3, the simulation unit 414 executes the API 22 with the oldest execution start time among the unexecuted APIs 22 immediately after the end of the executed API 22. The process then proceeds to Step S2.

In Step S4, the simulation unit 414 determines whether there is no history information of the API 21b corresponding to the API 21b of the existing application to be executed after the end time of the executed API 22. When there is no history information (YES), the process then ends. When there is the history information (NO), the process proceeds to Step S5.

In Step S5, the simulation unit 414 executes the API 22 of which execution start time is closest to the end time of the executed API 22 among the APIs 22 not executed in Step S1.

In this way, the simulation unit 414 executes the processes from Step S1 to Step S4 simulate the execution time of the API 22.

Returning to FIG. 3, the responsiveness analysis unit 415 analyzes responsiveness of the API 22, based on the execution cycle and the processing time of the API 22a corresponding to the newly added application 21a and the execution start time and the processing time of the API 22b corresponding to the existing application 21b. Specifically, the responsiveness analysis unit 415 analyzes the responsiveness of the API 22 based on the simulation result obtained by simulation of the execution time of the API 22.

Further, the responsiveness analysis unit 415 calculates a maximum value of a delay time of the API 22, as responsiveness of the API 22, based on the simulation result of the execution time of the API 22. Further, the responsiveness analysis unit 415 calculates a timing chart of the API 22, as responsiveness of the API 22, based on the simulation result of the execution time of the API 22.

Figure 5:
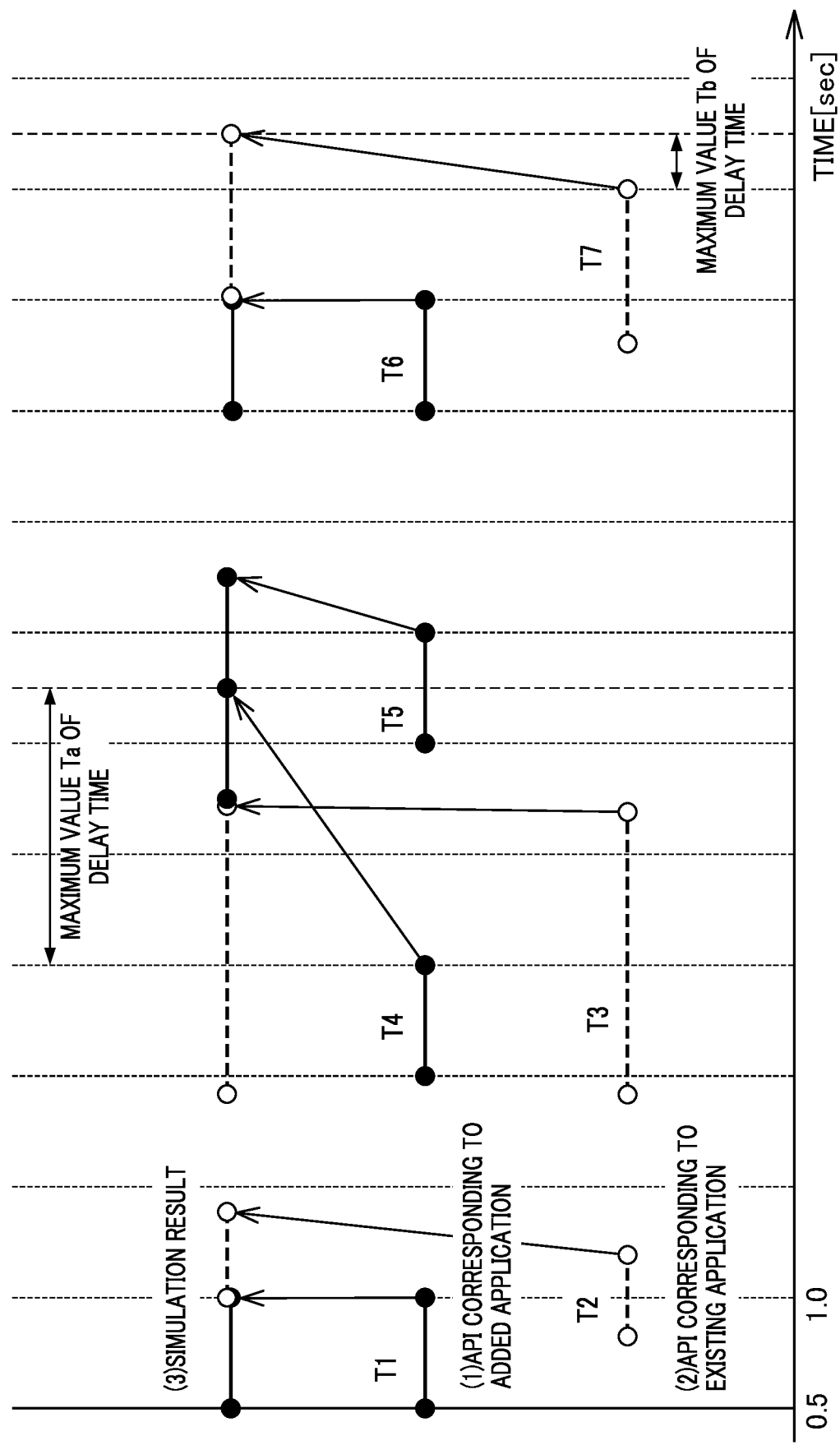
FIG. 5 is a diagram showing an example of a timing chart of an API.

FIG. 5 is a diagram showing an example of a timing chart of the API 22. In the timing chart shown in FIG. 5, the execution cycle and the processing time of the API 22a corresponding to the newly added application 21a are 1.5 seconds and 0.5 seconds, respectively. Further, it is assumed that there are multiple existing applications 21b and APIs 22b. In addition, the reference time is the oldest execution start time of the API 22 corresponding to the existing application 21b.

Referring to the flowchart shown in FIG. 4 and the timing chart shown on the left side in FIG. 5, in Step S1 in FIG. 4, the simulation unit 414 executes the API 22, that is, API 22a with the oldest execution start time among the API 22a corresponding to the newly added application 21*a* and the API 22*b* corresponding to the existing application 21*b* in simulation of the execution time of the API 22 (see T1 in FIG. 5).

In Step S2, the simulation unit 414 determines whether there is an API 22, which starts before the end time of the executed API 22*a*, among unexecuted APIs 22. In this case, since the API 22*b* corresponds to the API 22 which starts before the end time of the executed API 22*a*, the process proceeds to Step S3.

In Step S3, the simulation unit 414 executes the unexecuted API 22, that is, the API 22*b* immediately after the end of the executed API 22*a* (see T2 in FIG. 5).

Therefore, the simulation unit 414 can obtain a simulation result including execution of the API 22*b* immediately after the end of the API 22*a*.

Similarly, referring to the flowchart shown in FIG. 4 and the timing chart shown in the center in FIG. 5, in Step S2 after the end of Step S3, the simulation unit 414 determines whether there is an API 22, which starts before the end time of the executed API 22*b*, among the unexecuted APIs 22.

In this case, since there is no corresponding API 22, the process proceeds to Step S4. Then, in Step S4, since the history information of the API 22*b* corresponding to the existing application 21*b* to be executed after the end time of the executed API 22*b* exists, the simulation unit 414 proceeds to Step S5. Then, in Step S5, the simulation unit 414 executes the API 22*b* of which execution start time is closest to the end time of the executed API 22*b* (see 13 in FIG. 5).

The process proceeds to Step S2 again, and the simulation unit 414 determines whether there is an API 22, which starts before the end time of the executed API 22*b*, among the unexecuted APIs 22. In this case, since the API 22*a* corresponds to the API 22 which starts before the end time of the executed API 22*b*, the process proceeds to Step S3. In Step S3, the simulation unit 414 executes the unexecuted API 22, that is, the API 22*a* immediately after the end of the API 22*b* (see T4 in. FIG. 5).

The process proceeds to Step S2 again, and the simulation unit 414 determines whether there is an API 22, which starts before the end time of the executed API 22*a*, among the unexecuted APIs 22.

In this case, since the API 22*a* corresponds to the API 22 which starts before the end time of the executed API 22*a*, the process proceeds to Step S3. In Step S3, the simulation unit 414 executes the unexecuted API 22, that is, the API 22*a* immediately after the end of the API 22*a* (see T5 in FIG. 5).

Therefore, the simulation unit 414 can obtain a simulation result including execution of the API 22*a* after the end of the API 22*b* and execution of the API 22*a* again after the end of the API 22*a*.

Similarly, referring to the flowchart shown in FIG. 4 and the timing chart shown in the right side in FIG. 5, in Step S2 after the end of Step S3, the simulation unit 414 determines whether there is an API 22, which starts before the end time of the executed API 22*a*, among the unexecuted APIs 22.

In this case, since there is no corresponding API 22, the process proceeds to Step S4. Then, in Step S4, since the history information of the API 22*b* corresponding to the existing application 21*b* to be executed after the end time of the executed API 22*a* exists, the simulation unit 414 proceeds to Step S5. Then, in Step S5, the simulation unit 414 executes the API 22*a* of which execution start time is closest to the end time of the executed API 22*a* (see T6 in FIG. 5).

The process proceeds to Step S2 again, and the simulation. unit 414 determines whether there is an API 22, which starts before the end time of the executed API 22*a*, among the unexecuted APIs 22.

In this case, since the API 22*b* corresponds to the API 22 which starts before the end time of the executed API 22*a*, the process proceeds to Step S3. In Step S3, the simulation unit 414 executes the unexecuted API 22, that is, the API 22*b* immediately after the end of the API 22*a* (see T7 in FIG. 5).

Therefore, the simulation unit 414 can obtain a simulation result including execution of the API 22*b* immediately after the end of the API 22*a*.

Returning to FIG. 3, the display control unit 416 displays the responsiveness of the API 22 analyzed by the responsiveness analysis unit 415 on the display unit 36 (see FIG. 1) or the display unit 23 (see FIG. 2). Specifically, the display control unit 416 displays the maximum value of a delay time of the API 22 and/or the timing chart of the API 22, as the responsiveness of the API 22, on the display unit 36 or the display unit 23.

As shown in FIG. 5, the maximum value of the delay time indicates, after the end of the API 22 that starts first the execution, a difference between the end time of the API 22, which starts the execution, and the end time of the API 22 in the simulation result.

Specifically, a maximum value Tb of a delay time of the API 22*a* corresponding to the new application 21*a* is shown in the timing chart shown in the center in FIG. 5, and a maximum value Tb of a delay time of the API 22*b* corresponding to the existing application 21*b* is shown in the timing chart shown on the right side in FIG. 5

Further, as shown in FIG. 5, the timing chart of the API 22 includes the execution start time and the end time of the API 22*a* corresponding to the newly added application 21*a*, the execution start time and the end time of the API 22*b* corresponding to the existing application 21*b*, the simulation result, and the maximum values Ta and Tb, of the delay time.

The analysis control unit 417 shifts the execution start time of the API 22*a* corresponding to the newly added application 21*a* by a predetermined time, causes the simulation unit 414 to execute simulation, and causes the responsiveness analysis unit 415 to analyze the responsiveness of the API 22.

Specifically, after causing the simulation unit 414 to execute the simulation and causing the responsiveness analysis unit 415 to analyze the responsiveness of the API 22, the analysis control unit 417 shifts the execution start time of the API 22*a* corresponding to the newly added application 21*a* by a predetermined time.

Then, after shifting the execution start time of the API 22*a* by a predetermined time, the analysis control unit 417 causes the simulation unit 414 to execute the simulation and causes the responsiveness analysis unit 415 to analyze the responsiveness of the API 22 again.

Here, the predetermined time is, or example, a value obtained by dividing the execution cycle of the API 22*a* by n (n=1, 2, 3, . . . ). In addition, the execution start time is shifted, for example, in a positive (+) direction in a time coordinate system shown in FIG. 4. Further, until the execution start time is shifted by one execution cycle of the API 22*a* (1.5 seconds in the above example), the analysis control unit 417 executes repeatedly the shift of the execution start time, the simulation by the simulation unit 414, and the analysis of the responsiveness of the API 22 by the responsiveness analysis unit 415.

FIG. 6 is a flowchart showing the processing of the responsiveness analysis device 4. In Step S11, the execution history acquisition unit 411 accesses the execution history storage unit 35, and acquires history information on the execution time of the API 22.

In Step S12, the first determination unit 412 determines the execution cycle and the processing time of the API 22a corresponding to the application 21a newly added to the external device 2, based on the execution cycle and the processing time of the API 22a corresponding to the application 21a stored in the API call storage unit 421.

In Step S13, the second determination unit 413 acquires, from the history information acquired by the execution history acquisition unit 411, the execution start time and the processing time of the API 22b corresponding to the existing application 21b, and determines the execution start time and the processing time of the API 22b corresponding to the existing application 21b.

In Step S14, the simulation unit 414 simulates the execution time of the API 22, based on the execution cycle and the processing time of the API 22a corresponding to the newly added application 21a and the execution start time and the processing time of the API 22b corresponding to the existing application 21b.

In Step S15, the responsiveness analysis unit 415 analyzes the responsiveness of the API 22 based on the simulation result obtained by simulation of the execution time of the API 22. Specifically, the responsiveness analysis unit 415 analyzes the responsiveness of the API 22 based on the simulation result obtained by simulation of the execution time of the API 22. Further, the responsiveness analysis unit 415 calculates the maximum value of the delay time of the API 22, as the responsiveness of the API 22, based on the simulation result obtained by simulation of the execution time of the API 22.

In Step S16, the analysis control unit 417 shifts the execution start time of the API 22a corresponding to the newly added application 21a by a predetermined time.

In Step S17, the analysis control unit 417 determines whether the shift of the execution start time by one execution cycle of the API 22a has been completed. When the shift of the execution start time by one execution cycle has been completed (YES), the process proceeds to Step S18. On the other hand, when the shift of the execution start time by one execution cycle has not been completed (NO), the process proceeds to Step S14.

In Step S18, the display control unit 416 displays the maximum value of the delay time of the API 22 and/or the timing chart of the API 22, as the responsiveness of the API 22, on the display unit 36 or the display unit 23.

As described above, according to the present embodiment, the responsiveness analysis device 4 includes the execution history acquisition unit 411 that acquires the history information on the API 22, the first determination unit 412 that determines the execution cycle and the processing time of the API 22a corresponding to the newly added application 21a, the second determination unit 413 that determines the execution start time and the processing time of the API 22b corresponding to the existing application 21b, based on the history information acquired by the execution history acquisition unit 411, and the responsiveness analysis unit 415 that analyzes the responsiveness of the API 22, based on the execution cycle and the processing time of the API 22a corresponding to the newly added application 21a and the execution start time and the processing time of the API 22b corresponding to the existing application 21b.

Thus, the responsiveness analysis device 4 can obtain the responsiveness of the API 22 before actually changing the configuration of the application 21, for example. Therefore, the responsiveness analysis device 4 can efficiently check the responsiveness of the API 22 without checking the responsiveness of the application 21 by trial and error during the change of the configuration of the application 21 in actual.

Further, the responsiveness analysis device 4 further includes the simulation unit 414 that simulates the execution time of the API 22 based on the execution cycle and the processing time of the API 22a corresponding to the newly added application 21a and the execution start time and the processing time of the API 22b corresponding to the existing application 21b. The responsiveness analysis unit 415 analyzes the responsiveness of the API 22 based on the simulation result obtained by simulation of the execution time of the API 22.

Thus, the responsiveness analysis device 4 analyzes the responsiveness of the API 22 based on the simulation result obtained by the simulation of the execution time of the API 22. Therefore, the responsiveness analysis device 4 can efficiently check the responsiveness of the API 22 without checking the responsiveness of the application 21 by trial and error during the change of the configuration of the application 21 in actual.

Further, the responsiveness analysis unit 415 calculates the maximum value of the delay time of the API 22 as the responsiveness of the API 22. In addition, the responsiveness analysis unit 415 may calculate the timing chart of the API 22 as the responsiveness of the API 22. Thus, the responsiveness an device 4 can obtain the maximum value of the delay time of the API 22 and/or the timing chart of the API 22 as the responsiveness of the API 22, and can efficiently check the responsiveness of the API 22.

Further, the responsiveness analysis device 4 further includes the display control unit 416 that causes the display unit 36 or the display unit 23 to display the responsiveness of the API 22 analyzed by the responsiveness analysis unit 415. Thus, a user such as an operator who operates the responsiveness analysis device 4 can visually recognize the responsiveness of the API 22 displayed on the display unit 36 or the display unit 23.

Further, the responsiveness analysis device 4 further includes the analysis control unit 417 that, after the responsiveness of the API 22 is analyzed by the responsiveness analysis unit 415, shifts the execution start time of the API 22a corresponding to the newly added application 21a by the predetermined time, causes the simulation unit 414 to execute the simulation, and causes the responsiveness analysis unit 415 to analyze the responsiveness of the API 22. Thus, the responsiveness analysis device 4 can obtain the simulation result and the analysis of the responsiveness in more detail by shifting the execution start time.

Although the embodiment of the present invention has been described above, the above-mentioned responsiveness analysis device 4 flan be implemented by hardware, software, or a combination thereof. Further, the control method performed by the responsiveness analysis device 4 described above can be implemented by hardware, software, or a combination thereof. Here, the implementation by software means that implementation by a computer reading and executing a program.

The program may be stored and supplied to a computer using various types of non-transitory computer readable media. The non-transitory computer-readable media include various types of tangible storage media. Examples of non-transitory computer-readable media include magnetic storage media (for example, hard disk drives), optical magnetic storage media (for example, magneto-optical disks), a CD-ROM (Read Only Memory), CD-R, CD-R/W, and semiconductor memories (such as mask ROM, PROM (Programmable ROM), EPROM (Erasable PROM), flash ROM, RAM (random access memory)).

Moreover, although each of the above-described embodiments is a preferred embodiment of the present invention, the scope of the present invention is not limited only to each of the above-mentioned embodiments. Various modifications can be made without departing from the gist of the present invention.

EXPLANATION OF REFERENCE NUMERALS 1 numerical control system
2 external device
3 numerical control device
4 responsiveness analysis device
41 control unit
42 storage unit
411 execution history acquisition unit
412 first determination unit
413 second determination unit
414 simulation unit
415 responsiveness analysis unit
416 display control unit
417 analysis control unit

The invention claimed is:

1. A responsiveness analysis device comprising:
a processor;
an execution history acquisition unit that acquires history information on an application programming interface (API);
a first determination unit that determines an execution cycle and a processing time of the API corresponding to a newly added application;
a second determination unit that determines an execution start time and a processing time of the API corresponding to an existing application, based on the history information acquired by the execution history acquisition unit;
a responsiveness analysis unit that analyzes responsiveness of the API, based on the execution cycle and the processing time of the API corresponding to the newly added application and the execution start time and the processing time of the API corresponding to the existing application; and
a simulation unit that simulates an execution time of the API based on the execution cycle and the processing time of the API corresponding to the newly added application and the execution start time and the processing time of the API corresponding to the existing application,
wherein the responsiveness analysis unit analyzes and adjusts the responsiveness of the API based on a simulation result obtained by simulation of the execution time of the API.

2. The responsiveness analysis device according to claim 1, wherein the responsiveness analysis unit calculates a maximum value of a delay time of the API, as the responsiveness of the API.

3. The responsiveness analysis device according to claim 1, wherein the responsiveness analysis unit calculates a timing chart of the API, as the responsiveness of the API.

4. The responsiveness analysis device according to claim 1, further comprising a display control unit that causes a display unit to display the responsiveness of the API analyzed by the responsiveness analysis unit.

5. The responsiveness analysis device according to claim 1, further comprising an analysis control unit that, after the responsiveness of the API is analyzed by the responsiveness analysis unit, shifts an execution start time of the API corresponding to the newly added application by a predetermined time, causes the simulation unit to execute the simulation, and causes the responsiveness analysis unit to analyze the responsiveness of the API.

* * * * *